United States Patent [19]

Yasusaka et al.

[11] 3,815,133

[45] June 4, 1974

[54] DOPPLER RADAR EQUIPMENT WITH INTERFERENCE PREVENTING APPARATUS

[75] Inventors: Kazuo Yasusaka; Shigemichi Nagano, both of Tokyo, Japan

[73] Assignee: Nippon Electric Company, Limited, Tokyo, Japan

[22] Filed: Nov. 9, 1972

[21] Appl. No.: 304,929

[30] Foreign Application Priority Data
Nov. 12, 1971 Japan.......................... 46-90964

[52] U.S. Cl. ........... 343/8, 343/17.1 R, 343/17.1 PF
[51] Int. Cl................................................ G01s 9/46
[58] Field of Search ............ 343/8, 17.1 R, 17.1 PF

[56] References Cited
UNITED STATES PATENTS

| | | | |
|---|---|---|---|
| 3,208,065 | 9/1965 | Gutleber et al................ | 343/17.1 R |
| 3,217,323 | 11/1965 | Fackler et al...................... | 343/8 X |
| 3,234,548 | 2/1966 | Colby, Jr. ........................... | 343/8 X |
| 3,491,360 | 1/1970 | Stoorvogel ................... | 343/17.1 PF |
| 3,731,310 | 5/1973 | Rittenbach................... | 343/17.1 PF |

*Primary Examiner*—Malcolm F. Hubler
*Attorney, Agent, or Firm*—Sandoe, Hopgood & Calimafde

[57] ABSTRACT

A Doppler radar for preventing collisions between vehicles or the like includes apparatus for rejecting direct high frequency energy radiated by (vis-a-vis reflected from) other radar equipped vehicles. The apparatus includes locally generated, randomly operative gating for both the radar transmitter and receiver, and integration (low pass filtering) of the receiver output such that interference from other units is effectively excluded.

4 Claims, 5 Drawing Figures

3,815,133

DOPPLER RADAR EQUIPMENT WITH INTERFERENCE PREVENTING APPARATUS

DISCLOSURE OF INVENTION

This invention relates to electronic apparatus, and more specifically, to Doppler radar adapted for use on a vehicle or the like.

It has heretofore been proposed that Doppler radar equipment be used to prevent the collision of automobiles, trains, or the like, or to energize a shock absorber or other safety and/or warning structure. When a conventional continuous wave Doppler radar is employed, the individual radar units employed should have transmission frequencies different from one another, with a frequency guard band disposed around the respective transmission frequencies. To increase the number of radar units usable in a limited frequency range, the allotted band width thereof should be as narrow as possible. On the other hand, to obtain the range of relative velocities measurable by the Doppler principle, the band width should be relatively large.

Accordingly, when a plurality of vehicles, each having such a Doppler radar, approach one another, the receiver section of one of the units may receive not only the desired waves reflected from an oncoming object, but also the direct transmission waves of radar units having frequencies falling in the receiving band of the particular equipment. As a result, the frequency of an oscillator in the transmitter portion of the subject radar apparatus is pulled onto the frequency of the transmission waves originating with the other radar apparatus. If not, undesired beat frequency signals are generated between the transmitted waves from the subject transmitter section and the corresponding portion of the other radar unit. Thus, a malfunction or erroneous speed indication develops.

The measurement of relative velocity at a very short distance must be made in a highly reliable manner, particularly when the Doppler radar equipment is used on vehicles such as automobiles, since a failure in accurate distance determination may lead to a potentially fatal traffic accident. The continuous wave Doppler suggested by the prior art, exhibiting prospects for the foregoing malfunction or erroneous indications at short distances, cannot therefore be employed to implement in its present form a practical collision preventing system.

It is therefore an object of this invention to provide a Doppler radar which includes apparatus for preventing mutual interference, and which can be attached as an adapter to prior art type continuous-wave Doppler radar units.

It is another object of this invention to provide a transmission wave, random-sampling Doppler radar apparatus which prevents mutual interference.

It is a feature of the present invention that apparatus for preventing mutual interference in a Doppler radar includes a transmitter section comprising means for gating the received reflected wave signals after homodyne detection in synchronism with the random gating at the transmitter section; and means for producing a continuous signal representing the envelope of the output of the gating means whereby the possible influence waves transmitted by other radar a very short distance away is removed.

This invention will now be described in detail with reference to the accompanying drawings, in which.

Figure 1:
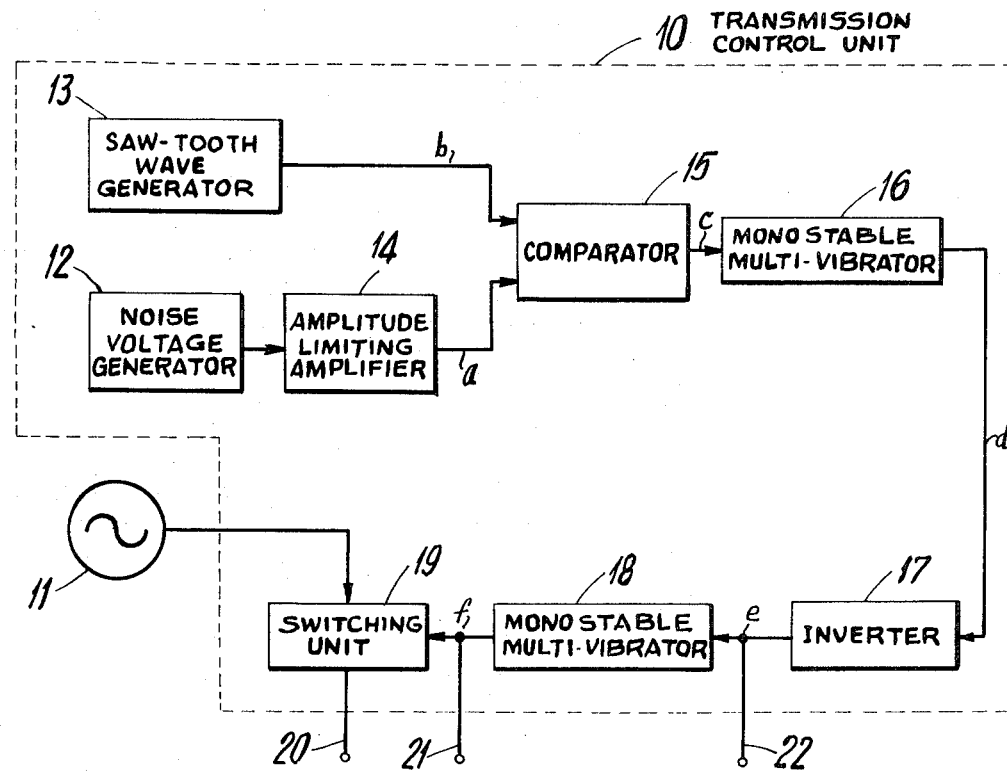
FIG. 1 is a block diagram showing an illustrative transmitter control section of apparatus for preventing mutual interference in a Doppler radar in accordance with the principles of this invention.

Referring to FIG. 1, a transmission control unit 10 in accordance with the present invention to prevent interference permits the output of a high-frequency electromagnetic wave source 11 (e.g. 10 GHz), which may be of the type employed in the prior art continuous wave Doppler radar equipment, to pass therethrough intermittently, at random periods. At the same time, the unit 10 develops a plurality of gating signals utilized in the radar receiving apparatus as described below. The transmission control unit 10 includes a noise voltage generator 12 for producing an output having random periods of a mean value $T_m$ and random amplitudes; a saw-tooth wave generator 13 of repeating fixed period $T_m$; an amplitude limiting amplifier 14 for amplifying the output noise voltages of the noise voltage generator 12 to a suitable level; an amplitude comparator 15 for comparing the outputs of the saw-tooth wave generator 13 and the amplifier 14 and which produces a predetermined output voltage only when a selected one of these outputs is larger than the other; a first monostable multivibrator 16 triggered by the output signal of the comparator 15; an inverter circuit 17 for inverting the voltage amplitude of the output pulse produced by the multivibrator 16; a second monostable multivibrator 18 responsive to the output of the inverter circuit 17; and a switching element 19 connected to the output of the high frequency electromagnetic wave source 11 for supplying the electromagnetic wave to a control unit output terminal 20 only when the output pulse of the second monostable multivibrator 18 is present. The output terminal 20 is connected to an antenna (not shown) for transmission and reception purposes. The outputs of the inverter circuit 17 and the second monostable multivibrator circuit 18 are connected to control unit 10 output terminals 21 and 22 to control the radar unit reception apparatus as described below.

Figure 2:
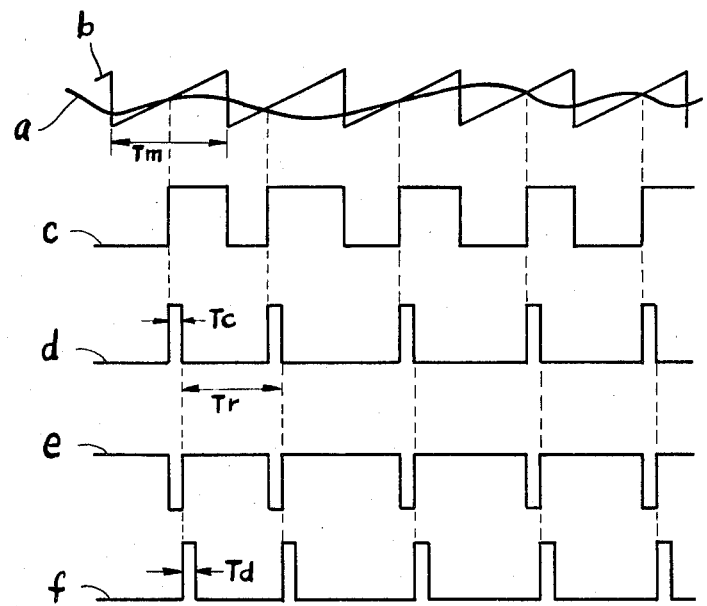
FIG. 2 is a waveform diagram of signals viewed at selected points in the block diagram of FIG. 1.

Referring now to FIG. 2, there is shown voltage waveforms (a) through (f) illustrating the potentials appearing at particular circuit points indicated by like reference characters in the block diagram of FIG. 1. The output (c) of the comparator 15 has a first (relatively high level) value so long as the output noise voltage (a) from the amplifier 14 is smaller than the saw-tooth wave (b), while the comparator output becomes zero when the saw-tooth exceeds the output potential of amplifier 14. The period $T_r$ of the output pulse (c) randomly varies, since the period of the noise voltage (a) fluctuates with respect to the mean random period $T_m$. The first monostable multivibrator 16 receiving the waveform (c) at its input produces the output of waveform (d) having the same random period $T_r$ as the waveform (c), and is characterized by a pulse width $T_c$.

The second monostable multivibrator 18 develops, in response to the leading edge of each polarity-inverted pulse (e) supplied thereto from the inverter 17, a pulse train (f) comprising pulses each delayed by the pulse width $T_c$ of the waveform (d) from the leading (rising) edge of waveform (c), and having a pulse width $T_d$.

Figure 3:
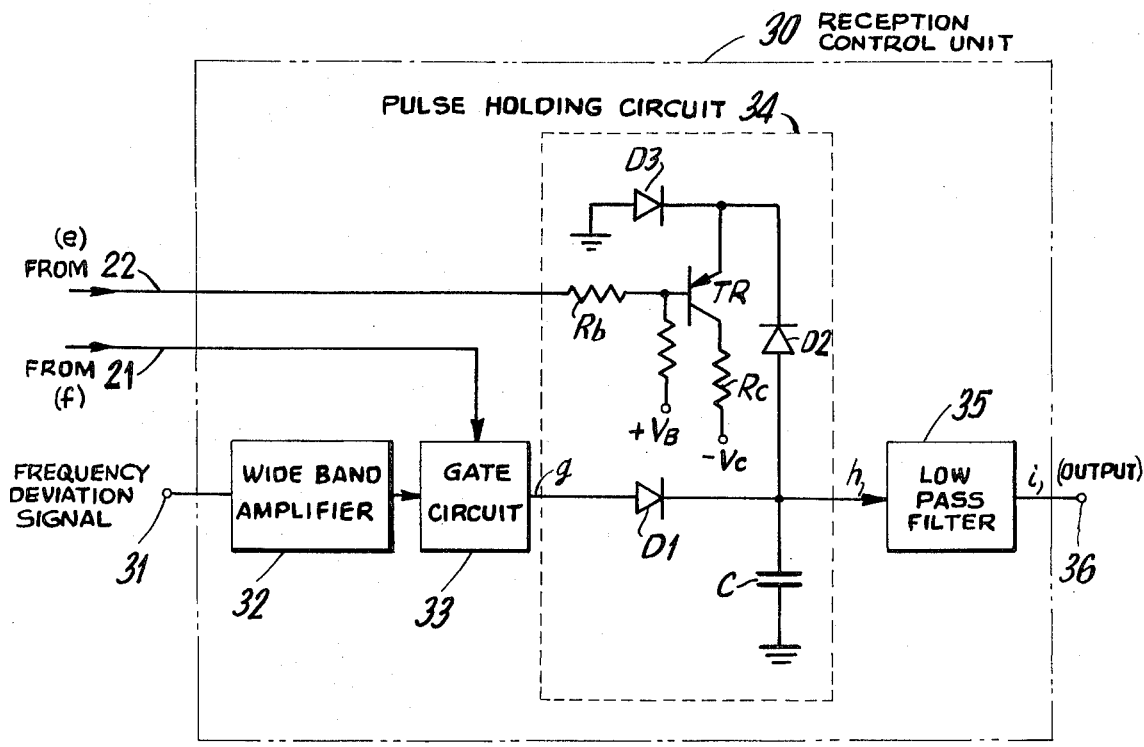
FIG. 3 is a block diagram showing an illustrative receiver control section of apparatus for preventing mutual interference in a Doppler radar.

Referring to FIG. 3 which shows a reception control unit 30 in combined block and schematic form, the waves reflected from an object (not shown) are applied to a homodyne detector (Not shown. For Further details with respect to homodyne reception, see pages 9, 10, and 52 of "Radio and Radar Technique," by A. T. Starr, Sir Isaac Pitman & Sons, Ltd. London, 1953). The received reflected signal is there converted into a signal representative of the deviation (shift) of the incoming signal frequency from the fixed transmitted frequency. This frequency deviation-representing voltage signal is applied to an input terminal 31 of the reception control unit. The control unit 30 comprises a wideband amplifier 32 for amplifying the input signal; a gate circuit 33 for selectively gating the output of the amplifier 32 in response to each output pulse from the second monostable multivibrator 18 in the transmission control unit 10 [waveform (f) in FIG. 2]; a pulse voltage holding circuit 34 for temporarily holding each of the output pulses supplied by the circuit 33; and a low-pass filter 35 for smoothing the output waves of the circuit 34. A doppler signal obtained at an output terminal 36 is supplied to a frequency meter of the type employed in conventional continuous wave Doppler radar apparatus to develop an indication of the relative speed between the object and the vehicle on which the Doppler radar apparatus of the invention is installed.

Figure 4:
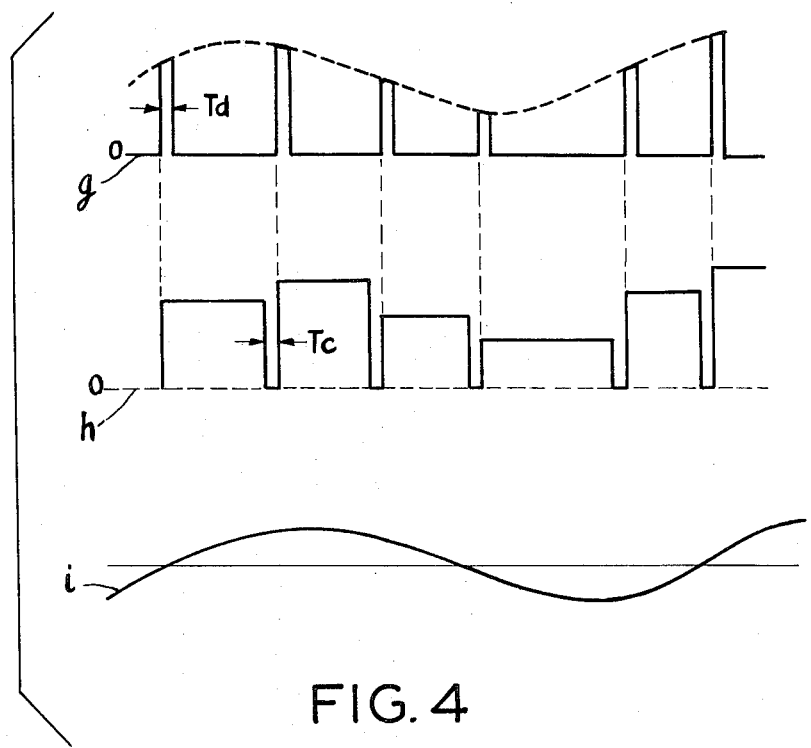
FIG. 4 is a waveform diagram of signals viewed at selected points in the block diagram of FIG. 3.

Referring now to FIG. 4, showing voltage waveforms (g) to (i) appearing at the particular circuit points indicated by like reference characters in FIG. 3, the output (g) of the gate circuit 33 has a certain voltage during a period of the pulse width $T_d$ of the control pulse (f) from the output terminal 21 (FIG. 1), and becomes zero between pulses. As set forth above in conjunction with FIGS. 1 and 2, the control pulses [(f) in FIG. 2] have a randomly varying period. In addition, the "ON" state of the gate circuit 33 in the reception control unit 30 is coincident with the "ON" state of the switching device 19 of the transmission control unit 10. For these reasons, only the reflected component of the waves transmitted by that (receiving) vehicle are effectively received. Even if transmitted waves from radar equipment at a very short distance are erroneously received within the critical time slot, the probability is very low that such spurious signals would pass through the gate circuit 33 which is randomly turned "ON", and would be successively and cumulatively be received over a span of several time slots. Hence, the interference from the radar equipment installed on other vehicles is substantially eliminated. The input pulses of the waveform (g) pass through the first diode $D_1$ of the peak value holding circuit 34 (FIG. 3), and are stored in a holding capacitor C.

The control pulses (the waveform (e) in FIG. 2) from the control pulse output terminal 22 of the transmission control unit 10 are supplied through a resistor $R_b$ of the hold circuit 34 to the base of a transister TR. A collector power source of $-V_C$ volts and a base bias voltage source of $+V_B$ volts are respectively connected to the transistor TR to quiescently maintain the transistor in the nonconductive, or "OFF" state so long as the control pulse [(e) in FIG. 2] is of its reference (high) voltage value. The transistor turns "ON" and resets the stored charge of the capacitor C to zero volts during the pulse width $T_c$ during which the control pulse takes its negative value. The control pulses (e) immediately precede those of the waveform (f) shown in FIG. 2, so that they discharge the capacitor C to zero volts immediately before each of the input pulses (g) is supplied to the hold circuit 34. A collector resistor $R_c$ of the transistor TR, the collector bias voltage $-V_c$ and a diode $D_3$ are provided to completely discharge the capacitor C to zero within the pulse width $T_c$ of the control pulse (e).

By virtue of the foregoing operation of the holding circuit 34 responsive to the control pulses (e) from the terminal 22, the input (g) is converted into the output (h). The signal (h) is smoothed, and the DC component thereof removed by the low-pass filter 35 to become the output signal (i). ).

As is apparent from the above explanation, the output signal waveform (i) exhibits an envelope of instantaneous values of the waveform (g) of the gate circuit 33, viz., the Doppler frequency shift representing voltage intermittently received at the irregular intervals.

Figure 5:
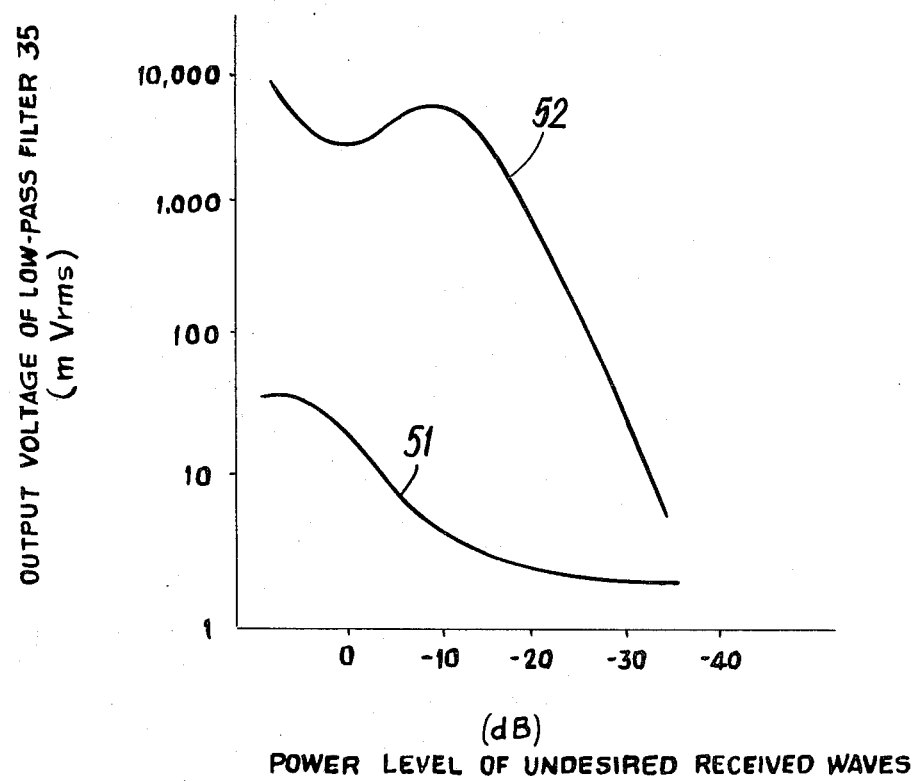
FIG. 5 is a diagram characterizing performance of the present invention vis-a-vis prior art apparatus.

In FIG. 5, prepared to definitively illustrate the technical advantages of the present invention, the abscissas axis represents (in dB) the power level of undesired received waves including the interference component attributable to the directly transmitted waves from other vehicles. The power level has been measured at the input of the homodyne detector with a 1 mW power level there as a reference. The ordinate axis represents in mV (root-mean-square voltage $mV_{rms}$) the output voltage of the low-pass filter 35. Curve 51 characterizing performance of the apparatus of this invention shows a distinct advantage compared with a characteristic curve 52 for conventional continuous wave Doppler radar equipment. More specifically, as seen in the drawing, the Doppler signal output of conventional equipment contains a considerable amount of interference in a region where the input level of the interference component is high (the left region on the abscissa). Correspondingly, the interference component appearing in the apparatus of this invention is reduced by 1/200 even for the worst case. The data treats conditions where the transmission wave frequency is 10.525 GHz; the mean random period $T_m$ is 33.3 $\mu$ sec.; both the pulse widths $T_c$ and $T_d$ are 0.33 $\mu$ sec.; the cutoff frequency of the low-pass filter 35 is 3 kHz; and the frequency difference of transmitting waves of an adjacent Doppler radar is less than 5 kHz.

The distinct advantage effected by this invention will be quite apparent from a consideration of the characteristic curves.

The above described arrangement is merely illustrative of the principles of the present invention. Numerous modifications and adaptations thereof will be readily apparent to those skilled in the art without departing from the spirit and scope of the present invention.

What is claimed is:

1. Doppler radar apparatus for use on a vehicle comprising means for generating high frequency electromagnetic waves of a fixed frequency, means for transmitting said electromagnetic waves towards an object and for receiving waves reflected from the object, and means for converting into a voltage the difference in frequency between said reflected waves and said fixed frequency waves to thereby detect relative velocity between the vehicle and the object, wherein said Doppler radar apparatus further comprises means for generating a first pulse wavetrain having a predetermined pulse width and an irregular repetition period, means for generating from said first pulse wavetrain a delayed pulse wavetrain having a predetermined delay with respect to said first pulse wavetrain, means responsive to said delayed pulse wavetrain for controlling the transmission of said electromagnetic waves such that the period of the transmission changes in an irregular manner, means responsive to said delayed pulse wavetrain for irregularly interrupting the output of said frequency difference-to-voltage converting means, means supplied with said first pulse wavetrain and connected to said interrupting means for holding the output voltage of said interrupting means over said period, and a low-pass filter coupled to said holding means for smoothing the output of said holding means.

2. A combination as in claim 1, wherein said Doppler radar apparatus further comprises means connected to said holding means for supplying said first pulse wavetrain to said holding means to restore said holding means to a cleared state.

3. A combination as in claim 2, wherein said first pulse generating means comprises a saw-tooth wave generator, a noise generator, a comparator for comparing the outputs of said generators to produce a pulse series of irregular width and irregular intervals, a monostable multivibrator responsive to said pulse series for producing said first pulse wavetrain of a predetermined width and irregular intervals.

4. A combination as claimed in claim 3, wherein said first pulse generating means further comprises an inverter connected to the output of said multivibrator, and an additional monostable multivibrator coupled to said inverter for providing said delayed pulse wavetrain.

* * * * *